(12) United States Patent
Sugai

(10) Patent No.: US 9,994,048 B2
(45) Date of Patent: Jun. 12, 2018

(54) LIQUID DISCHARGE APPARATUS AND LIQUID DISCHARGE METHOD

(71) Applicant: SEIKO EPSON CORPORATION, Tokyo (JP)

(72) Inventor: Keigo Sugai, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/389,154

(22) Filed: Dec. 22, 2016

(65) Prior Publication Data

US 2017/0182798 A1 Jun. 29, 2017

(30) Foreign Application Priority Data

Dec. 28, 2015 (JP) ................. 2015-255791

(51) Int. Cl.
*B41J 2/03* (2006.01)
*B41J 11/00* (2006.01)
*B33Y 30/00* (2015.01)
*B29C 64/209* (2017.01)

(52) U.S. Cl.
CPC .......... *B41J 11/002* (2013.01); *B29C 64/209* (2017.08); *B33Y 30/00* (2014.12); *B41J 2/03* (2013.01)

(58) Field of Classification Search
CPC .................. B41J 2/03; B41J 11/002
See application file for complete search history.

(56) References Cited

U.S. PATENT DOCUMENTS 6,866,370 B2 * 3/2005 Jeanmaire ................. B41J 2/03
 347/77
2002/0105557 A1 * 8/2002 Teshigawara .......... B41J 2/2125
 347/15

\* cited by examiner

*Primary Examiner* — Lamson Nguyen
(74) *Attorney, Agent, or Firm* — Workman Nydegger

(57) ABSTRACT

A liquid discharge apparatus includes: a head unit that discharges a liquid from each of a plurality of nozzles and causes a liquid column to extend downwardly; a liquid droplet generating unit that irradiates the liquid column with a laser beam from a position separated from the plurality of nozzles and separates liquid droplets from the liquid column; and a direction changing unit that applies energy to the liquid droplets and changes a flying direction of the liquid droplets.

14 Claims, 8 Drawing Sheets

LIQUID DISCHARGE APPARATUS AND LIQUID DISCHARGE METHOD

BACKGROUND

1. Technical Field

The present invention relates to a liquid discharge apparatus and a liquid discharge method.

2. Related Art

As an aspect of a liquid discharge apparatus that discharges a liquid, an ink jet printer that discharges ink and produces printed matter, or a 3D printer that discharges a liquid material and forms a three-dimensional object is known. For example, an ink jet printer disclosed in JP-A-6-64161 causes a heat generating unit (laser) provided in a portion of the nozzle to change a viscosity of a liquid column of ink that is formed at a nozzle and to generate pulsation in the liquid column, thereby continually forming ink particles.

However, in technology disclosed in JP-A-6-64161, since the heat generating unit is provided in a portion of the nozzle from which ink is discharged, dried ink is likely to be attached and accumulated on an edge of the nozzle and thus the nozzle is likely to have a low ink discharge performance. In an ink jet printer in the related art, there has been a demand for technology in which it is possible to reduce accumulation of ink in the vicinity of a nozzle such that it is possible to stably discharge ink. In addition, in the ink jet printer, there has been a demand for technology in which it is possible to more effectively discharge ink. The technology described above has objects that are common not only to an ink jet printer that is used for producing printed matter but also in liquid discharge apparatuses of various types having a mechanism capable of discharging a liquid. In particular, in a 3D printer that discharges a liquid material and produces a three-dimensional object, there has been a strong demand for improved discharge technology for a liquid material because a liquid material having a relatively high viscosity is also used in some cases.

SUMMARY

An advantage of some aspects of the invention is to solve at least a part of the problems described above, and the invention can be implemented as the following forms.

[1] According to an aspect of the invention, a liquid discharge apparatus is provided. The liquid discharge apparatus may include a head unit, a liquid droplet generating unit, and a direction changing unit. The head unit may discharge a liquid from each of a plurality of nozzles and may cause a liquid column to extend downwardly. The liquid droplet generating unit may irradiate the liquid column with a laser beam from a position separated from the plurality of nozzles and separate liquid droplets from the liquid column. The direction changing unit may apply energy to the liquid droplets and change a flying direction of the liquid droplets. The head unit may include first and second nozzle arrays in each of which the plurality of nozzles are arranged. When the head unit is viewed in a direction toward the head unit, from a position at which the liquid droplet generating unit emits the laser beam, the first nozzle array is positioned in front of the second nozzle array and each of the nozzles included in the second nozzle array is disposed at a position shifted in a horizontal direction from each of the nozzles included in the first nozzle array. In the liquid discharge apparatus according to the aspect, since the liquid columns extending downwardly from the nozzles are irradiated with the laser beam from the position separated from the nozzles, the liquid is less dried and accumulated in the vicinity of discharge openings of the nozzles and thus degradation in a discharge performance of the liquid is reduced. In addition, since the plurality of nozzles are arranged in the head unit such that it is possible to irradiate a plurality of the liquid columns with the laser beam in the same direction, it is efficient to generate the liquid droplets through the irradiation with the laser beam.

[2] In the liquid discharge apparatus according to the aspect described above, the liquid droplet generating unit may irradiate, with at least the one laser beam, the liquid columns extending downwardly from the first nozzle array and the liquid columns extending downwardly from the nozzles of the second nozzle array. In the liquid discharge apparatus according to the aspect, since the liquid columns extending downwardly from the second nozzle array are irradiated with the laser beam that passes between the liquid columns extending downwardly from the nozzles of the first nozzle array, less light energy for generating the liquid droplets is wasted.

[3] In the liquid discharge apparatus according to the aspect described above, the laser beam may have a condensed shape of which a horizontal width in the horizontal direction is wider than a vertical width in a vertical direction and irradiation may be performed over a plurality of the liquid columns extending downwardly from the first and second nozzle arrays, respectively. The liquid discharge apparatus according to the aspect is efficiently used because it is possible to generate liquid droplets at the same time from the plurality of liquid columns extending downwardly from the first and second nozzle arrays through the irradiation with the laser beam which is performed once.

[4] In the liquid discharge apparatus according to the aspect described above, the liquid droplet generating unit may perform scanning with the laser beam such that irradiation is performed on a plurality of the liquid columns extending downwardly from the first and second nozzle arrays, respectively. In the liquid discharge apparatus according to the aspect, the scanning with the laser beam enables the light energy for generating the liquid droplets to be efficiently applied to the plurality of liquid columns extending downwardly from the first and second nozzle arrays. In addition, it is also possible to increase a density of energy that is applied to the liquid droplets through reduction in a diameter of a spot of the laser beam.

[5] In the liquid discharge apparatus according to the aspect described above, the direction changing unit may perform irradiation with a laser beam and may apply light energy as the energy to the liquid droplets generated from the first and second nozzle arrays, respectively. In the liquid discharge apparatus according to the aspect, high controllability of the flying direction of the liquid droplets is achieved.

[6] In the liquid discharge apparatus according to the aspect described above, the direction changing unit may irradiate, with at least the one laser beam, the liquid droplets generated from the first nozzle array and the liquid droplets generated from the second nozzle array. In the liquid discharge apparatus according to the aspect, it is possible to efficiently change the flying direction of the liquid droplets.

[7] In the liquid discharge apparatus according to the aspect described above, the head unit may include a first liquid chamber that communicates with each of the plurality of nozzles which configure the first nozzle array, and that stores a liquid, and a second liquid chamber that communicates with each of the plurality of nozzles which configure the second nozzle array, and that stores a liquid. In the liquid discharge apparatus according to the aspect, it is efficient to supply the liquid to the plurality of nozzles.

[8] In the liquid discharge apparatus according to the aspect described above, the liquid stored in the first liquid chamber may be a first liquid and the liquid stored in the second liquid chamber may be a second liquid containing a component that is different from components of the first liquid. The liquid discharge apparatus according to the aspect is efficiently used because it is possible to utilize at least two types of liquids at the same time.

[9] In the liquid discharge apparatus according to the aspect described above, the liquid droplet generating unit may generate liquid droplets having a first size and liquid droplets having a second size that is larger than the first size. In the liquid discharge apparatus according to the aspect, since it is possible to discharge liquid droplets having a size that is suitable for an application, it is easy to produce printed matter or a three-dimensional object.

[10] The liquid discharge apparatus according to the aspect described above may further include a collecting unit that collects the liquid droplets having the first size or the liquid droplets having the second size and resupplies the collected liquid to the head unit. In the liquid discharge apparatus according to the aspect, since it is possible to collect and to reuse the liquid droplets, it is possible to efficiently use the liquid.

[11] In the liquid discharge apparatus according to the aspect described above, the direction changing unit may change a flying direction of the liquid droplets having the first size, but may not change a flying direction of the liquid droplets having the second size, and the collecting unit may not collect the liquid droplets having the first size, of which the flying direction is changed, but may collect the liquid droplets having the second size, of which the flying direction is not changed. In the liquid discharge apparatus according to the aspect, since it is possible to perform printing or forming of a three-dimensional object by controlling the flying direction of the liquid droplets having the relatively small first size, it is possible to form an image or a three-dimensional object with high accuracy.

[12] In the liquid discharge apparatus according to the aspect described above, the direction changing unit may change a flying direction of the liquid droplets having the first size, but may not change a flying direction of the liquid droplets having the second size, and the collecting unit may collect the liquid droplets having the first size, of which the flying direction is changed, but may not collect the liquid droplets having the second size, of which the flying direction is not changed. In the liquid discharge apparatus according to the aspect, since the flying direction of the liquid droplets having the relatively small first size is changed and the liquid droplets are collected, it is possible to more efficiently collect the liquid droplets, compared to a case where the flying direction of the liquid droplets having the second size is changed and the liquid droplets are collected.

[13] The liquid discharge apparatus according to the aspect described above may further include an energy applying unit that applies energy to the liquid droplets having landed on a predetermined target object. In the liquid discharge apparatus according to the aspect, for example, it is possible to perform a processing treatment in which landing liquid droplets are fixed to a target object, or the like.

[14] In the liquid discharge apparatus according to the aspect described above, the liquid may be a flowable composition that contains powder and a solvent, and the energy applying unit may apply energy to the liquid droplets having landed, thereby sintering the powder in the liquid droplets, or melting the powder in the liquid droplets and then solidifying the powder. In the liquid discharge apparatus according to the aspect, the powder in the liquid is sintered or solidified, thereby making it possible to fix the landing liquid droplets to a target object.

The plurality of components included in the aspects of the invention described above are not all required and, in order to achieve some or all of the objects described above, or in order to achieve some or all of the effects described in the specification, it is possible to appropriately perform modification, removal, or replacement with another new component, on some of the plurality of components, or to partially remove specific details. In addition, in order to achieve some or all of the objects described above, or in order to achieve some or all of the effects described in the specification, it is possible to combine some or all of technical features included in an aspect of the invention described above and some or all of technical features included in another aspect of the invention described above such that another aspect of the invention is established.

The invention can be implemented as various aspects in addition to the liquid discharge apparatus. For example, the invention can be implemented as a method for discharging a liquid. In addition, the invention can be implemented as an aspect of a three-dimensional-object forming apparatus, a three-dimensional-object forming method, an image forming apparatus, an image forming method, a printing apparatus, a printing method, a control method for each apparatus described above, a computer program that implements each of the methods and control methods described above, a non-transitory computer readable medium storing the computer program, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
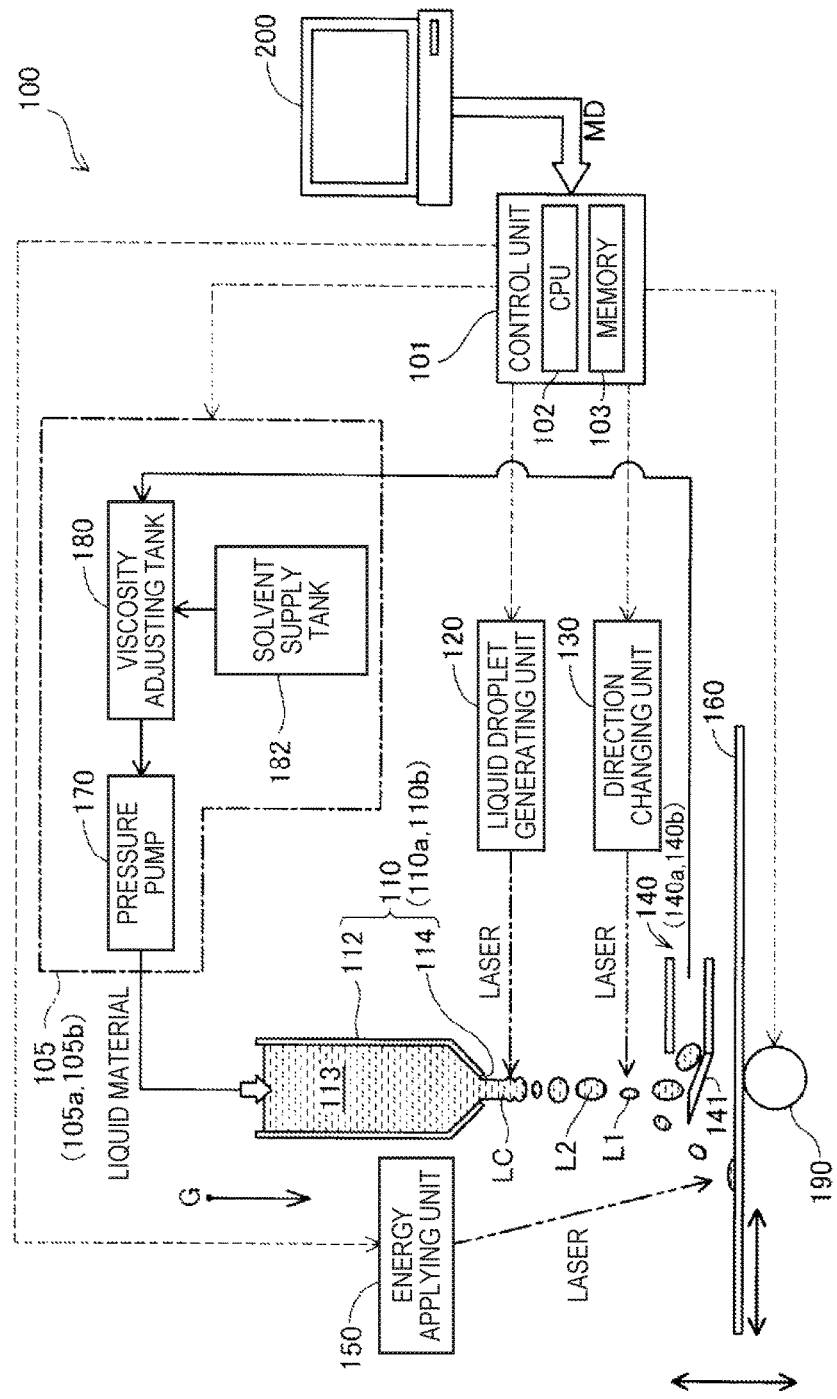
FIG. 1 is a diagram depicting a schematic configuration of a liquid discharge apparatus of a first embodiment.

FIG. 1 is a diagram depicting a schematic configuration of a liquid discharge apparatus 100 according to a first embodiment of the invention. In FIG. 1, arrow G represents the direction of gravitational force (vertical direction) when the liquid discharge apparatus 100 is disposed in a normal service state. Arrow G representing the vertical direction is appropriately shown in the drawings to which the following description is referred.

The liquid discharge apparatus 100 of the embodiment is a so-called 3D printer, discharges a liquid material from the head unit 110 toward a forming stage 160, stacks layers formed of a corresponding solidified primary material on the forming stage 160, and produces a three-dimensional object. The liquid discharge apparatus 100 includes a control unit 101, a liquid supply unit 105, a liquid droplet generating unit 120, a direction changing unit 130, a collecting unit 140, an energy applying unit 150, and a moving mechanism 190, in addition to the head unit 110 and the forming stage 160.

The control unit 101 controls the entirety of the liquid discharge apparatus 100. The control unit 101 is configured of a microcomputer that includes at least a CPU 102 and a memory 103. The CPU 102 reads and executes a program in the memory 103, thereby controlling entire operations of the liquid discharge apparatus 100. The program may be recorded in various types of recording medium.

A computer 200 is connected to the control unit 101. The control unit 101 receives, from the computer 200, data MD for forming a three-dimensional object. The data MD contains data indicating a discharge position of the liquid material on the layers stacked in a height direction of the three-dimensional object. The control unit 101 may directly acquire data via a network, a recording medium, or the like, without the computer 200. The following description is provided about control flow of the liquid discharge apparatus 100 by the control unit 101 performed when a three-dimensional object is formed.

The liquid discharge apparatus 100 of the embodiment includes the head unit 110, first and second head units 110a and 110b, and liquid materials which contain different material components from each other are discharged from the head units 110a and 110b, respectively. The two head units 110a and 110b have the same configuration as each other. In the following description, the head unit 110 means both of the two head units 110a and 110b. The head unit 110 includes a liquid storing portion 112 and a nozzle 114. The liquid storing portion 112 is configured of a hollow container that is capable of storing a liquid material, and stores the liquid material in an inner liquid chamber 113. In the embodiment, the liquid storing portion 112 is made of stainless steel. The liquid material used in the liquid discharge apparatus 100 of the embodiment is described below.

The liquid material stored in the liquid storing portion 112 is discharged outside through the nozzle 114. In the embodiment, the nozzle 114 communicates with a lower end of an inner space of the liquid storing portion 112 and is provided as a communication hole that opens toward a region positioned vertically below the head unit 110. The opening of the nozzle 114 may have a diameter of, for example, about 5 to 100 μm. Immediately after the liquid material is discharged from the nozzle 114, the liquid material extends downwardly from the nozzle 114 and forms a liquid column LC. In the embodiment, the liquid column LC is formed to have a diameter of about 10 to 100 m. In FIG. 1, only one nozzle 114 is illustrated for the convenience sake. However, in the embodiment, a plurality of nozzles 114 arranged in a row are provided to the liquid storing portion 112. A configuration of the head unit 110 will be described in detail below.

The liquid discharge apparatus 100 of the embodiment includes first and second liquid supply units 105a and 105b as the liquid supply unit 105. The first liquid supply unit 105a supplies the liquid material to the first head unit 110a and the second liquid supply unit 105b supplies the liquid material to the second head unit 110b. The first and second liquid supply units 105a and 105b have the same configuration as each other. In the following description, the liquid supply unit 105 means both of the two liquid supply units 105a and 105b. The liquid supply unit 105 supplies the liquid material to the liquid storing portion 112 of the head unit 110 and applies pressure to the liquid material such that the liquid material is discharged from the nozzle 114. The liquid supply unit 105 includes a pressure pump 170, a viscosity adjusting tank 180, and a solvent supply tank 182.

The liquid material is stored in the viscosity adjusting tank 180, and a solvent component of the liquid material is stored in the solvent supply tank 182. A solvent is supplied to the viscosity adjusting tank 180 from the solvent supply tank 182. In addition, as will be described below, a liquid material collected by the collecting unit 140 is supplied to the viscosity adjusting tank 180. The viscosity adjusting tank 180 mixes the liquid material stored therein with the solvent supplied from the solvent supply tank 182 and adjusts a viscosity of the liquid material. The control unit 101 controls an amount of the solvent supplied from the solvent supply tank 182 such that the liquid material has a predetermined viscosity. In the embodiment, in the viscosity adjusting tank 180, the viscosity of the liquid material is adjusted to be 50 mPa·s or higher.

The liquid material in the viscosity adjusting tank 180 is supplied to the liquid storing portion 112 of the head unit 110 due to driving of the pressure pump 170. Pressure is applied by the pressure pump 170, and thereby the liquid material is discharged from the nozzle 114 of the head unit 110. The control unit 101 monitors, with a manometer (not illustrated), the pressure of the liquid material in the head unit 110 and performs feedback control of the pressure that is applied to the liquid material by the pressure pump 170. In this manner, a flow rate of the liquid material is adjusted such that the liquid material extends downwardly from the nozzle 114 and has a liquid column shape. It is desirable that the flow rate of the liquid material is determined in consideration of the viscosity of the liquid material. In the embodiment, the control unit 101 adjusts the pressure of the liquid material such that the flow rate of the liquid material that is discharged from the nozzle 114 is 10 m/sec to 20 m/sec.

The liquid droplet generating unit 120 applies energy to the liquid columns LC of the liquid material extending downwardly from the plurality of nozzles 114 of the head unit 110, respectively, from a position separated from the head unit 110, thereby generating liquid droplets of the liquid material from the corresponding liquid column LC. In the embodiment, the liquid droplet generating unit 120 is configured of a laser device, irradiates, with a laser beam, the liquid column LC of the liquid material, and applies light energy to the liquid column. The liquid droplet generating unit 120 includes at least a laser beam source and a condenser for condensing, on the liquid material having the liquid column shape, a laser beam emitted from the laser beam source. An internal configuration of the liquid droplet generating unit 120 is not illustrated.

The liquid droplet generating unit 120 of the embodiment irradiates the liquid column LC extending downwardly from the nozzle 114, with a pulsed laser beam having cyclically changing energy. When the liquid column LC is irradiated with such a laser beam, a portion having a high temperature and a portion having a low temperature are formed in the liquid column LC in a direction in which the liquid material flows (in a direction in which the liquid column LC extends downwardly). A temperature gradient generated in the liquid column LC causes a portion of the liquid column LC to have a small and reduced diameter, causes the liquid column LC to be torn at the portion, and causes liquid droplets to be generated. The generated liquid droplets drop in the vertical direction due to action of gravity. In this manner, in the configuration in which light energy is applied to the liquid column LC of the liquid material from the laser beam, it is possible to form a sufficient temperature gradient for forming liquid droplets, in the liquid column LC, even in a case of using a liquid material having a high viscosity suitable for forming a three-dimensional object.

Here, a size of liquid droplets that are separated and fly from the liquid column LC is determined depending on characteristics of the liquid material, a timing of irradiation with the laser beam by the liquid droplet generating unit 120, and an amount of energy (a wavelength or intensity of the laser beam) that is applied to the liquid column LC from the laser beam. In the embodiment, the control unit 101 controls the timing of irradiation with the laser beam by the liquid droplet generating unit 120, thereby generating first liquid droplets L1 having a first size and second liquid droplets L2 having a second size that is larger than the first liquid droplets L1 having the first size. In the specification, a size of a liquid droplet means a volume of a liquid droplet. Here, the size of the liquid droplet may be construed as a weight of the liquid droplet. In the embodiment, the liquid column LC is irradiated with the laser beams at different irradiation intervals and thereby the size of the liquid droplet is adjusted. For example, when the irradiation with the laser beams is performed at short intervals, it is possible to generate liquid droplets having a small size to the extent of the short intervals. When the irradiation with the laser beams is performed at long intervals, it is possible to generate liquid droplets having a large size to the extent of the long intervals. In the embodiment, when the first liquid droplets L1 are generated, the control unit 101 more decreases the intervals of the irradiation with the laser beams, compared to a case where the second liquid droplets L2 are generated. Note that the control unit 101 may control time of irradiation, an output of irradiation, a wavelength, a range of irradiation with the laser beam, thereby generating liquid droplets having different sizes from each other.

In the embodiment, the liquid droplet generating unit 120 irradiates, with the laser beam, the liquid column LC of the liquid material at a position separated from the nozzle 114 by a predetermined distance. A distance between the nozzle 114 and the irradiation position with the laser beam may be, for example, about 0.3 to 0.7 mm. In the embodiment, the liquid column LC of the liquid material is irradiated with the laser beam at a position vertically below the nozzle 114, which is separated from the nozzle by 0.5 mm. In addition, in the embodiment, the liquid droplet generating unit 120 performs the irradiation with the laser beam toward the liquid column LC extending downwardly from the nozzle 114, in a direction that obliquely intersects with an arrangement direction of the nozzles 114 in the head unit 110. The laser beam emitted from the liquid droplet generating unit 120 has a width with which it is possible to irradiate the plurality of liquid columns LC extending downwardly from the nozzles 114, at a time. An emitting direction of a laser beam from the liquid droplet generating unit 120 and a shape of the laser beam will be described in detail below. Note that, in the specification, the emitting direction of the laser beam means a direction parallel to an optical axis of the laser beam.

The direction changing unit 130 is provided below the liquid droplet generating unit 120. The direction changing unit 130 applies energy to at least some liquid droplets generated by the liquid droplet generating unit 120 and fly in the vertical direction, thereby changing the flying direction thereof. In the embodiment, the direction changing unit 130 is configured of a laser device and applies light energy to the first liquid droplets L1 having the first size. The direction changing unit 130 includes at least a laser beam source and a condenser for condensing, on the liquid droplets, a laser beam emitted from the laser beam source. An internal configuration of the direction changing unit 130 is not illustrated.

In the embodiment, the direction changing unit 130 is capable of performing parallel irradiation with a plurality of laser beams and, thus, one laser beam is emitted to one nozzle 114. The direction changing unit 130 emits a laser beam from a direction perpendicular to the flying direction of the liquid droplets. In addition, in the embodiment, the direction changing unit 130 performs the irradiation with the laser beam from the direction perpendicular to the arrangement direction of the nozzles 114 in the head unit 110. The position at which the liquid droplet generating unit 120 irradiates the flying liquid droplets with the laser beam may be, for example, a position vertically below the head unit 110, which is separated from the head unit by 0.8 mm to 1.2 mm. In the embodiment, a distance between the head unit 110 and the irradiation position with the laser beam by the direction changing unit 130 may be, for example, about 1 mm.

When the flying liquid droplets are irradiated with the laser beam, at least a part of a solvent in the liquid droplets is instantaneously gasified, then gas is produced, and the flying direction of the liquid droplets is changed due to pressure of the gas. More specifically, the flying direction of the liquid droplets is bent to the emitting direction of the laser beam by the direction changing unit 130. The higher the energy of the irradiation with the laser beam and the smaller the size of the liquid droplet, the more a degree of a change in the flying direction of the liquid droplet is increased. The irradiation with the laser beam by the direction changing unit 130 is performed at a timing at which the liquid droplets cross the direction changing unit 130. In the embodiment, the control unit 101 links the timing of the laser-beam irradiation by the direction changing unit 130 with a timing at which the first liquid droplets L1 are generated by the liquid droplet generating unit 120 and determines the timing of the laser-beam irradiation by the direction changing unit. The intensity or the wavelength of the laser beam emitted from the direction changing unit 130 may be determined in advance depending on the characteristics of the liquid material and the size of the first liquid droplets L1, or the intensity or the wavelength may be controlled by the control unit 101. In this manner, since a laser beam can instantaneously apply energy for changing the flying direction to a liquid droplet, high controllability of the flying direction of the liquid droplets is achieved. In addition, in the embodiment, since the direction changing unit 130 is capable of performing irradiation with one laser beam with respect to one nozzle 114, it is possible to apply light energy to the liquid droplets selected from the liquid droplets discharged from the nozzles 114 and, thus, the higher controllability of the flying direction of the liquid droplets is achieved.

In addition, when the flying direction of the liquid droplets is changed through applying the light energy to the liquid droplets, it is possible to achieve the following effects. For example, in a case of employing a configuration in which the liquid droplets are charged and the flying direction is changed due to an electrostatic force, there is a need to use a liquid material that can be charged. By comparison, in the liquid discharge apparatus 100 of the embodiment, since the flying direction of the liquid droplets is changed by using the light energy, it is possible to use a liquid material that cannot be charged or is difficult to be charged. Hence, the liquid material that is used in producing of a three-dimensional object can be selected from a broad range of types of liquid materials.

The first liquid droplets L1, of which the flying direction is changed by the direction changing unit 130, land on the forming stage 160 that is disposed vertically below the head unit 110. The forming stage 160 may be made of a flat plate-shaped member that horizontally extends and may be disposed vertically below the head unit 110 at a position separated from the head unit by 1.5 to 3 mm. In the embodiment, a distance between the forming stage 160 and the head unit 110 is about 2 mm. In addition, in the embodiment, the forming stage 160 is relatively shifted, by the moving mechanism 190, in the horizontal direction and the vertical direction with respect to the head unit 110 and the energy applying unit 150. The moving mechanism 190 includes a motor, a roller, a shaft, various actuators or the like, for moving the forming stage 160. The movement of the forming stage 160 by the moving mechanism 190 is controlled by the control unit 101. Note that another embodiment may employ a configuration in which the position of the forming stage 160 is fixed and the head unit 110 and the energy applying unit 150 are shifted with respect to the forming stage 160.

The energy applying unit 150 applies energy to the liquid droplets that land on the forming stage 160 such that the liquid droplets harden. In the embodiment, the energy applying unit 150 is configured of a laser device, performs irradiation with a laser beam, and thereby applies light energy to the liquid droplets. The energy applying unit 150 includes at least a laser beam source, a condenser for condensing, on landing liquid droplets, a laser beam emitted from the laser beam source, and a galvano mirror for scanning with the laser beam (which are not illustrated). The energy applying unit 150 scans, with the laser beam, a landing position of the liquid droplets on the forming stage 160 and a powder material in the liquid droplets is sintered due to the light energy of the laser beam. Otherwise, the powder material in the liquid droplets is melted and then is solidified. In this manner, particles, which configure a three-dimensional object as a producing target and a support portion for supporting the three-dimensional object, are fixed on the forming stage 160.

In the embodiment, among the liquid droplets generated by the liquid droplet generating unit 120, the second liquid droplets L2, of which the flying direction is not changed by the direction changing unit 130, are collected by the collecting unit 140. The collecting unit 140 is also called a "gutter". The liquid discharge apparatus 100 of the embodiment includes first and second collecting units 140a and 140b as the collecting unit 140. The first collecting unit 140a collects the liquid droplets discharged from the first head unit 110a and the second collecting unit 140b collects the liquid droplets discharged from the second head unit 110b.

The two collecting units 140a and 140b have the same configuration as each other. In the following description, the collecting unit 140 means both of the first and second collecting units 140a and 140b. The collecting unit 140 has a receptacle 141 for collecting the liquid droplets L2. The receptacle 141 is disposed below the nozzle 114 so as to receive the liquid droplets that fly in the vertical direction. The receptacle 141 of the first collecting unit 140a is disposed below the first head unit 110a and the receptacle 141 of the second collecting unit 140b is disposed below the second head unit 110b. It is desirable that the receptacle 141 of the second collecting unit 140b is disposed below the receptacle 141 of the first collecting unit 140a such that the receptacle 141 of the second collecting unit 140b is less likely to receive the liquid droplets from the first head unit 110a by accident. The liquid droplets received in the receptacle 141 are gathered by a suction device (not illustrated) such as a suction pump and is sent to the corresponding viscosity adjusting tanks 180 of the liquid supply units 105a and 105b. In this manner, in the liquid discharge apparatus 100 of the embodiment, since the liquid droplets collected by the collecting unit 140 are reused, less liquid material is wasted.

Particularly in the embodiment, as described above, the flying direction of the first liquid droplets L1 having the small size is changed by the laser beam from the direction changing unit 130 and the liquid droplets L1 are caused to land on the forming stage 160. Hence, it is possible to form a three-dimensional object in a more accurate and fine manner. In addition, in the embodiment, since the second liquid droplets L2 having the large size are collected in the collecting unit 140, it is possible to enhance collection efficiency of the liquid material and to efficiently reuse the liquid material. Further, in the embodiment, since the flying direction of the first liquid droplets L1 having the small size is changed by the direction changing unit 130, it is possible to more increase the change in the flying direction, compared to a case of changing the flying direction of the second liquid droplets L2 having the large size. Therefore, the liquid droplets that need to land on the forming stage 160 are less likely to be collected in the collecting unit 140 by accident.

As described above, in the liquid discharge apparatus 100 of the embodiment, liquid materials which contain different material components from each other are discharged from the first and second head units 110a and 110b, respectively. The two liquid materials used in the liquid discharge apparatus 100 of the embodiment are both flowable compositions that contain powder and a solvent. Examples of the two liquid materials may include a slurry or paste of mixed materials that contains a solvent, a binder, and, for example, powder of a single element of magnesium (Mg), iron (Fe), cobalt (Co), chromium (Cr), aluminum (Al), titanium (Ti), copper (Cu), or nickel (Ni), or mixed powder such as an alloy containing one or more types of metal described above (maraging steel, stainless steel, cobalt-chromium-molybdenum, a titanium alloy, a nickel alloy, an aluminum alloy, a cobalt alloy, or a cobalt-chromium alloy). In addition, other examples of the liquid materials may include melting resins of general-purpose engineering plastics or the like, such as a polyamide, polyacetal, polycarbonate, modified polyphenylene ether, polybutylene terephthalate, or polyethylene terephthalate. Otherwise, still other examples of the liquid materials may include resins of engineering plastics or the like such as a polysulfone, polyethersulfone, polyphenylene sulfide, polyarylate, polyimide, polyamide-imide, polyetherimide, or polyether ether ketone. As described above, there is no particular limitation on the liquid material and it is possible to use metal other than the metal described above, ceramics, resins or the like. Examples of the solvent of the liquid material may include, for example, water; (poly) alkylene glycol monoalkyl ethers such as ethylene glycol monomethyl ether, ethylene glycol monoethyl ether, propylene glycol monomethyl ether, or propylene glycol monoethyl ether; acetate esters such as ethyl acetate, n-propyl acetate, isopropyl acetate, n-butyl acetate, or isobutyl acetate; aromatic hydrocarbons such as benzene, toluene, or xylene; ketones such as methyl ethyl ketone, acetone, methyl isobutyl ketone, ethyl-n-butyl ketone, diisopropyl ketone, or acetylacetone; alcohols such as ethanol, propanol, or butanol; tetraalkylammonium acetates; a sulfoxide-based solvent medium such as dimethyl sulfoxide or diethyl sulfoxide; a pyridine-based solvent medium such as pyridine, γ-picoline, or 2,6-lutidine; an ionic liquid such as tetraalkylammonium acetate (for example, tetrabutylammonium acetate), or a combination of one or more types selected from the substances described above. In addition, examples of the binder may include, for example, acrylic resins, epoxy resins, silicone resins, cellulose-based resins, synthetic resins other than the resins described above, polylactic acid (PLA), a polyamide (PA), polyphenylene sulfide (PPS), or thermoplastic resins other than the substances described above.

In the embodiment, for example, a liquid material for forming a main body portion of a three-dimensional object may be discharged from the first head unit 110a, and a liquid material for forming a support portion, which supports the main body portion and is removed after completion of the forming of the main body portion, may be discharged from the second head unit 110b. In addition, liquid materials for forming portions of the three-dimensional object having different physical properties such as a color or a texture, strength, or stiffness may be discharged from the first head unit 110a and the second head unit 110b, respectively.

Figure 2:
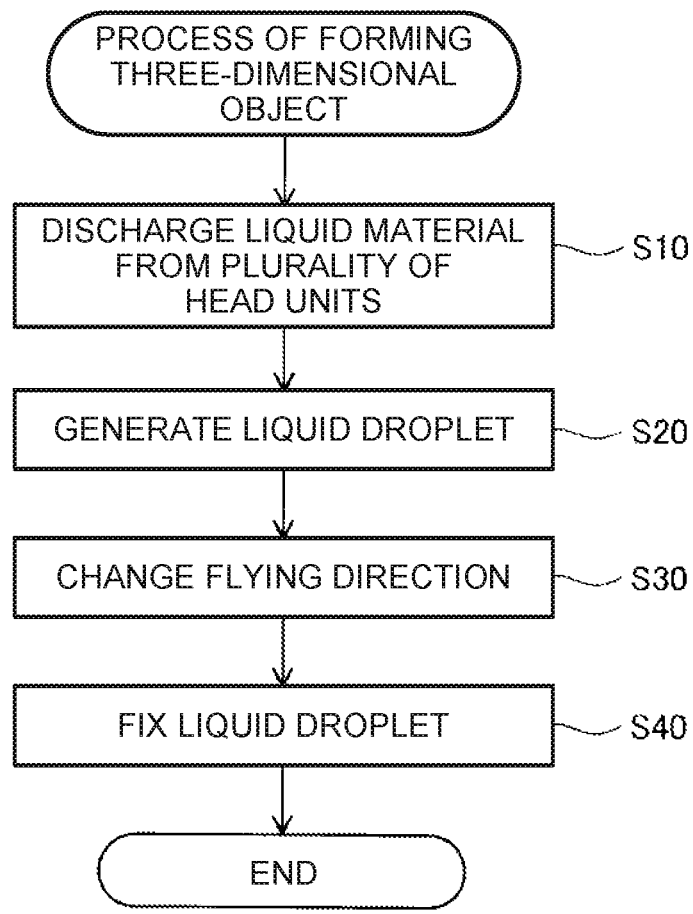
FIG. 2 is a flowchart illustrating a process performed when a three-dimensional object is formed.

FIG. 2 is a flowchart illustrating a process performed by the liquid discharge apparatus 100 under the control by the control unit 101 when a three-dimensional object is formed. When the three-dimensional object is formed, the control unit 101 causes the liquid discharge apparatus 100 to repeatedly execute the following processes in accordance with a program. In step S10, the control unit 101 controls the pressure pump 170 of the liquid supply unit 105 such that the liquid material is discharged to have a liquid column shape from the plurality of nozzles 114 of the head units 110a and 110b. The control unit 101 determines, in advance, a head unit and a timing at which the liquid material is discharged from the head unit 110a or 110b, based on data MD received from the computer 200. In step S20, the control unit 101 controls the liquid droplet generating unit 120 such that the liquid droplet generating unit irradiates, with the laser beam, the liquid columns LC extending downwardly from the plurality of nozzles 114 of the head unit 110, respectively, and then the liquid droplets are generated. Note that the control unit 101 determines, in advance, a timing at which the irradiation is performed with the laser beam, based on the data MD received from the computer 200.

In step S30, the control unit 101 controls the direction changing unit 130 such that the direction changing unit irradiates, with the laser beam, the first liquid droplets L1 of the generated liquid droplets and changes the flying direction of the liquid droplets. In addition, in step S30, the control unit 101 controls the moving mechanism 190 based on the data MD such that the moving mechanism causes the forming stage 160 to move. In this manner, the landing position of the liquid droplets having the changed flying direction on the forming stage 160 is adjusted. Note that, as described above, the second liquid droplets L2, of which the flying direction is not changed, are collected in the collecting unit 140 and returns to the liquid supply unit 105.

In step S40, the control unit 101 controls the energy applying unit 150 such that the energy applying unit irradiates, with the laser beam, the liquid material that lands on the forming stage 160, solidifies the liquid material and fixes the liquid material to the landing position. The processes in steps S10 to S40 are repeatedly performed and solidified material particles are stacked, and thereby the three-dimensional object is formed on the forming stage 160.

Figure 3:
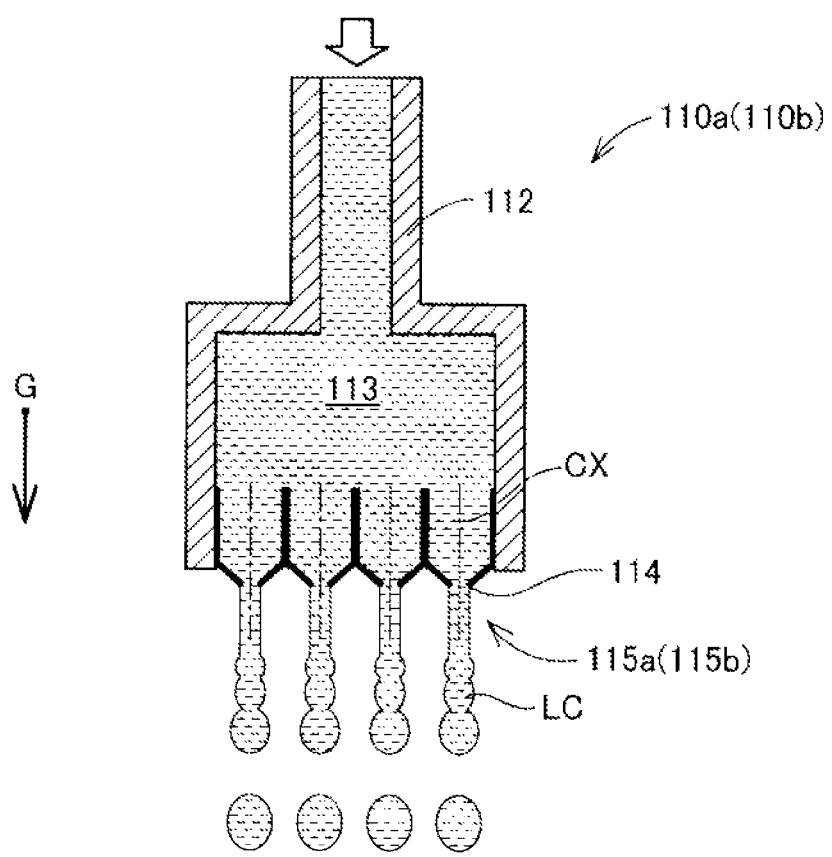
FIG. 3 is a sectional view schematically illustrating a configuration of a head unit.

FIG. 3 is a sectional view schematically illustrating a configuration of the first head unit 110a viewed when the head unit is cut along a virtual plane including central axes CX of the plurality of nozzles 114. In the liquid discharge apparatus 100 of the embodiment, the first head unit 110a has a first nozzle array 115a in which the plurality of nozzles 114 are arranged in a row in a predetermined arrangement direction. FIG. 3 illustrates four nozzles 114, for the convenience sake. In the embodiment, the nozzles 114 of the first nozzle array 115a are straightly aligned in a case where the nozzles are viewed in the vertical direction. The nozzles 114 of the first nozzle array 115a are arranged at substantially equal intervals. A distance between the central axes CX of the nozzles 114 may be, for example, 100 to 200 μm.

The nozzles 114 communicate with the liquid chamber 113 of the liquid storing portion 112. In other words, in the embodiment, the liquid chamber 113 is common to the nozzles 114. In this manner, the liquid material having substantially equal pressure is supplied to the nozzles 114 from the liquid storing portion 112, in a substantially uniform manner, and the liquid columns LC having substantially the same state are formed from the nozzles 114. As described above, the liquid discharge apparatus 100 of the embodiment is efficiently used because the control unit 101 controls the pressure pump 170 of the first liquid supply unit 105a such that the plurality of liquid columns LC are efficiently formed at the same time from the plurality of nozzles 114 of the first head unit 110a. In addition, since the liquid material is discharged from the plurality of nozzles 114 of the first head unit 110a at the same time, it is possible to form the three-dimensional object at a high speed.

Similar to the first head unit 110a, the second head unit 110b has a second nozzle array 115b in which the plurality of nozzles 114 are arranged, and the liquid storing portion 112 in which the liquid chamber 113 communicating with the nozzles 114 is formed. Also in the second head unit 110b, it is possible to achieve the same operational effects achieved in the first head unit 110a as described above. However, in the first head unit 110a and the second head unit 110b, the positions of the nozzles 114 in the nozzle arrays 115a and 115b are shifted from each other in the arrangement direction in which the nozzles 114 are arranged. Details thereof will be described below.

Figure 4:
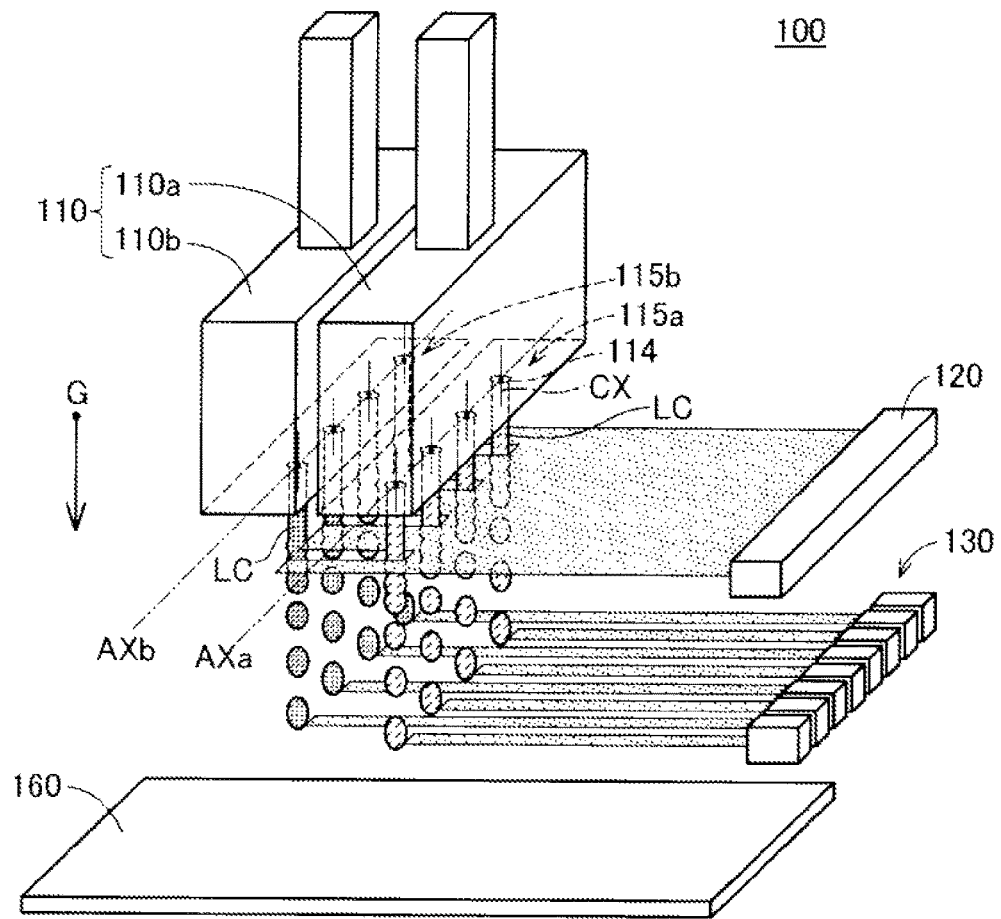
FIG. 4 is a perspective view schematically illustrating a positional relationship between the head unit, a liquid droplet generating unit, a direction changing unit, and a forming stage.

FIG. 4 is a perspective view schematically illustrating a positional relationship between the head unit 110, the liquid droplet generating unit 120, the direction changing unit 130, and the forming stage 160 in the liquid discharge apparatus 100. FIG. 4 schematically illustrates a state in which the liquid materials are discharged from the nozzles 114 of the first and second head units 110a and 110b and both of the liquid droplet generating unit 120 and the direction changing unit 130 perform the irradiation the laser beams. In addition, FIG. 4 illustrates the central axes CX of the nozzles 114 and axial lines AXa and AXb that represent the arrangement directions of the first and second nozzle arrays 115a and 115b.

In the liquid discharge apparatus 100 of the embodiment, the head unit 110, the liquid droplet generating unit 120, the direction changing unit 130, and the forming stage 160 are disposed in the vertical direction in this order. The first and second head units 110a and 110b are arranged to be adjacent to each other in a direction orthogonal to the arrangement direction of the nozzles 114 of the nozzle arrays 115a and 115b such that the first and second nozzle arrays 115a and 115b have a positional relationship of being parallel to each other. A positional relationship of the nozzles 114, which configure the first and second nozzle arrays 115a and 115b, will be described below.

The liquid droplet generating unit 120 is provided at a position separated from the head unit 110 in the direction orthogonal to the arrangement direction of the nozzles 114, and performs the irradiation with one laser beam extending in a straight line shape toward the head unit 110 from the position. The laser beam, with which the irradiation is performed by the liquid droplet generating unit 120, extends in a straight line shape, in a strip shape, or in a flat plate shape, toward a region below the head unit 110 from which the liquid columns LC of the liquid material are formed. The laser beam emitted from the liquid droplet generating unit 120 has a horizontal width which is wider than a vertical width, and the horizontal width is a width with which it is possible to irradiate the plurality of liquid columns LC extending downwardly from the nozzles 114 of the head unit 110, at a time. In the specification, the horizontal width of the laser beam means a diameter of the laser beam in the horizontal direction, and the vertical width of the laser beam means a diameter of the laser beam in the vertical direction. The liquid discharge apparatus 100 of the embodiment is efficiently used because the liquid droplets are generated from the plurality of liquid columns LC at the same time through the irradiation with the laser beam having a condensed shape in which the horizontal width is wide. Note that the condensed shape of the laser beam emitted from the liquid droplet generating unit 120 of the embodiment will be described in detail below.

The direction changing unit 130 is provided at a position below the liquid droplet generating unit 120 and performs irradiation with a plurality of laser beams parallel to each other, from the position in the direction orthogonal to the arrangement direction of the nozzles 114. The direction changing unit 130 performs the irradiation with the number of laser beams that corresponding to the number of the nozzles 114 in the head unit 110. Each of the laser beams emitted from the direction changing unit 130 is orthogonal to any one of the central axes CX of the nozzles 114 which extend in the vertical direction. It is desirable that a diameter of a spot of each laser beam which is emitted from the direction changing unit 130 is determined in advance depending on the characteristics of the liquid material and the size of the liquid droplets that are generated by the liquid droplet generating unit 120.

Figure 5:
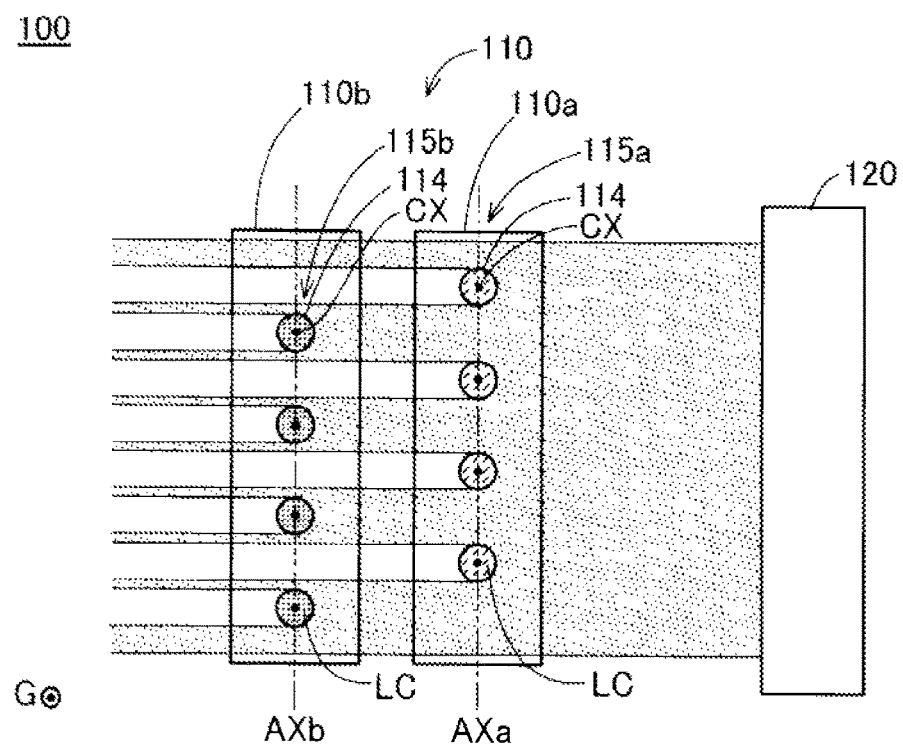
FIG. 5 is a schematic diagram depicting a configuration of arrangement of nozzles in the head unit and irradiation to liquid columns with a laser beam.

With reference to FIG. 5, a configuration of the arrangement of the plurality of nozzles 114 in the head unit 110 and an irradiation state with the laser beam to the liquid column LC extending downwardly from the nozzles 114 by the liquid droplet generating unit 120 are described. FIG. 5 schematically illustrates the head unit 110 and the liquid droplet generating unit 120 when the liquid discharge apparatus 100 is viewed from below in the vertical direction. FIG. 5 schematically illustrates a state in which the liquid columns LC generated from the nozzles 114 are irradiated with the laser beam emitted from the liquid droplet generating unit 120. In addition, similar to FIG. 4, FIG. 5 illustrates positions of the central axes CX of the nozzles 114 and axial lines AXa and AXb that represent the arrangement directions.

In the liquid discharge apparatus 100 of the embodiment, the first head unit 110a is positioned in front of the second head unit 110b when viewed from the position at which the irradiation with the laser beam is performed by the liquid droplet generating unit 120 (hereinafter, also simply referred to as a "laser-irradiation position"). In addition, as described above, the first and second head units 110a and 110b are arranged such that the directions of the arrangement of the nozzles 114 of the first and second nozzle arrays 115a and 115b are parallel to each other.

In the liquid discharge apparatus 100 of the embodiment, when the nozzles are viewed in a direction from the laser-irradiation position toward the head unit 110, the nozzles 114 of the second nozzle array 115b is positioned to be shifted in a horizontal direction from the nozzles 114 of the first nozzle array 115a. The specific details thereof are as follows. In the embodiment, the nozzle arrays 115a and 115b are configured of the same number of nozzles 114, and the nozzles 114 are arranged at substantially equal intervals both in the nozzle arrays 115a and 115b. Regarding to the second nozzle array 115b, the positions of the nozzles 114 in the second nozzle array 115b are shifted in the arrangement direction from the positions of the corresponding nozzles 114 in the first nozzle array 115a. More specifically, the nozzles 114 in the second nozzle array 115b are disposed at positions shifted by a distance substantially half the arrangement interval of the nozzles 114 in the first nozzle array 115a, from the positions of the corresponding nozzles 114 in the first nozzle array 115a. Thus, when viewed in the direction described above, each of the nozzles 114 of which the second nozzle array 115b is disposed between the nozzles 114 disposed to be adjacent to each other in the first nozzle array 115a. In other words, in the embodiment, it is possible to construe that the plurality of nozzles 114 in the head unit 110 are arranged to have a zigzag shape in a direction intersecting with the direction in which the irradiation is performed with the laser beam.

As described above, the liquid droplet generating unit 120 performs irradiation with the laser beam toward the nozzle array 115a and 115b in the direction orthogonal to the arrangement directions of the nozzles 114 which are represented by axial lines AXa and AXb. In addition, in the embodiment, the horizontal width of the laser beam that is emitted from the liquid droplet generating unit 120 is wider than a distance between the nozzles 114 that are positioned at both ends of the head unit 110 in the arrangement direction of the nozzles 114. Hence, it is possible to irradiate, with one laser beam that is emitted from the liquid droplet generating unit 120, all of the liquid columns LC extending downwardly from the first and second nozzle arrays 115a and 115b.

Thus, in the liquid discharge apparatus 100 of the embodiment, the irradiation with the laser beam with respect to the head unit 110 in the same direction enables the light energy for generating the liquid droplets to be applied to the liquid columns LC extending downwardly from the first and second nozzle arrays 115a and 115b. In addition, in the liquid discharge apparatus 100 of the embodiment is efficiently used because it is possible to irradiate, with the laser beam for generating the liquid droplets, the plurality of liquid columns LC extending downwardly from the first nozzle array 115a. In addition, since it is possible to irradiate, with the laser beam that passes between the liquid columns LC extending downwardly from the first nozzle array 115a, the liquid columns LC extending downwardly from the second nozzle array 115b, light energy passing through the head unit 110 is reduced. Accordingly, less energy for generating the liquid droplets is wasted.

Figure 6:
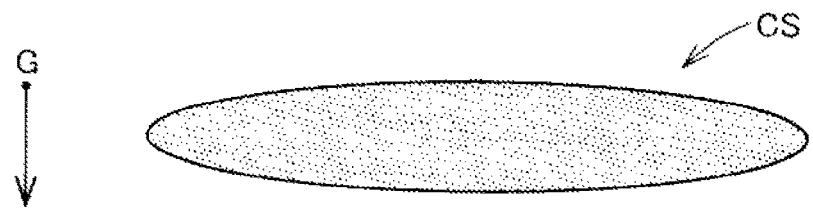
FIG. 6 is a diagram schematically illustrating an example of a condensed shape of the laser beam emitted from the liquid droplet generating unit.
Figure 7:
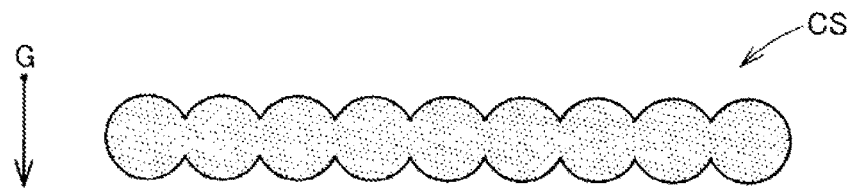
FIG. 7 is a diagram schematically illustrating another example of a condensed shape of the laser beam emitted from the liquid droplet generating unit.

With reference to FIG. 6 and FIG. 7, the condensed shape of the laser beam that is emitted from the liquid droplet generating unit 120 is described. FIG. 6 and FIG. 7 schematically illustrate examples of the condensed shape CS as shapes of the corresponding laser beams on a sectional plane perpendicular to the emitting direction of the laser beam that is emitted from the liquid droplet generating unit 120. The liquid droplet generating unit 120 may perform irradiation with the laser beam having the condensed shape of a substantially elliptical shape of which the horizontal width is wider than the vertical width such that the condensed shape of the laser beam is formed by a condenser as illustrated in FIG. 6. Otherwise, the liquid droplet generating unit 120 may be configured of a fiber-integrated laser device that performs irradiation in a state in which optical fibers are disposed in parallel to form a straight line shape and the parallel laser beams from the optical fibers overlap each other. In this case, the condensed shape of the laser beam is a shape in which a plurality of substantially circular shapes are continuous in the horizontal direction, as illustrated in FIG. 7. Note that the condensed shape of the laser beam emitted from the liquid droplet generating unit 120 is not limited to the shapes illustrated in FIGS. 6 and 7.

As described above, in the liquid discharge apparatus 100 of the embodiment, the liquid droplet generating unit 120 applies the energy for generating the liquid droplets to the liquid material at a position separated from the nozzles 114. Therefore, the liquid material or components therein are less dried and accumulated in the vicinity of each of the nozzles 114, and the discharge of the liquid material from the nozzle 114 is less inhibited, and thereby discharge performance of the liquid material is stabilized. In addition, as illustrated in the embodiment, when the configuration in which the energy for generating the liquid droplets is applied from the outside of the head unit 110, it is possible to omit a mechanism for generating the liquid droplets in the head unit 110. Hence, it is possible to simplify a structure of the head unit 110, it is possible to easily increase the pressure resistance of the head unit 110, and it is possible to use a liquid material having a higher viscosity.

In addition, in the liquid discharge apparatus 100 of the embodiment, the head unit 110 has the first and second nozzle arrays 115a and 115b, and thereby a nozzle density indicating the number of nozzles 114 per a unit area in the head unit 110 is increased. In addition, the plurality of liquid columns LC extending downwardly from the first and second nozzle arrays 115a and 115b are irradiated with the laser beam that is emitted from the liquid droplet generating unit 120. In this manner, the light energy is less likely to be wasted and the energy efficiency for generating the liquid droplets is increased. In addition, in the liquid discharge apparatus 100 of the embodiment, it is possible to achieve various operational effects described in the embodiment.

B. Second Embodiment

Figure 8:
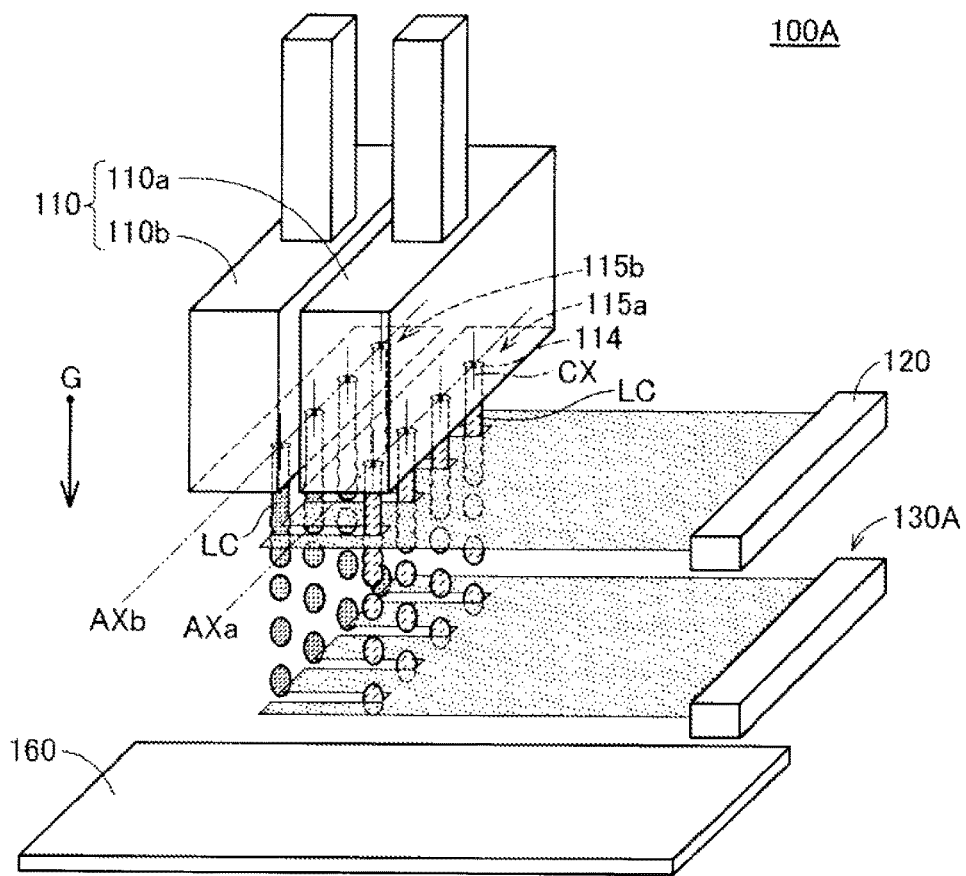
FIG. 8 is a diagram schematically depicting a configuration of a liquid discharge apparatus of a second embodiment.

FIG. 8 is a diagram schematically depicting a configuration of a liquid discharge apparatus 100A of the second embodiment of the invention. Similar to FIG. 4, FIG. 8 illustrates the head unit 110, the liquid droplet generating unit 120, a direction changing unit 130A, and the forming stage 160 included in the liquid discharge apparatus 100A of the second embodiment. The liquid discharge apparatus 100A of the second embodiment is substantially the same as the liquid discharge apparatus 100 of the first embodiment, except for a different configuration of the direction changing unit 130A. In the liquid discharge apparatus 100A of the second embodiment, the direction changing unit 130A performs irradiation with the laser beam having a condensed shape having a wide horizontal width, similar to the liquid droplet generating unit 120. The direction changing unit 130A can irradiate, with one laser beam, all of the liquid droplets generated at the first and second nozzle arrays 115a and 115b at a time. The liquid discharge apparatus 100A of the second embodiment is efficiently used, because the irradiation with the laser beam once enables the flying directions of the plurality of liquid droplets to be changed. In addition, since the liquid droplets generated from the second nozzle array 115b are irradiated with the laser beams that pass between rows of liquid droplets generated from the first nozzle array 115a, the laser beams from the direction changing unit 130A less leak wastefully. In addition, in the liquid discharge apparatus 100A of the second embodiment, it is possible to achieve the same types of various operational effects as described in the first embodiment.

C. Third Embodiment

Figure 9:
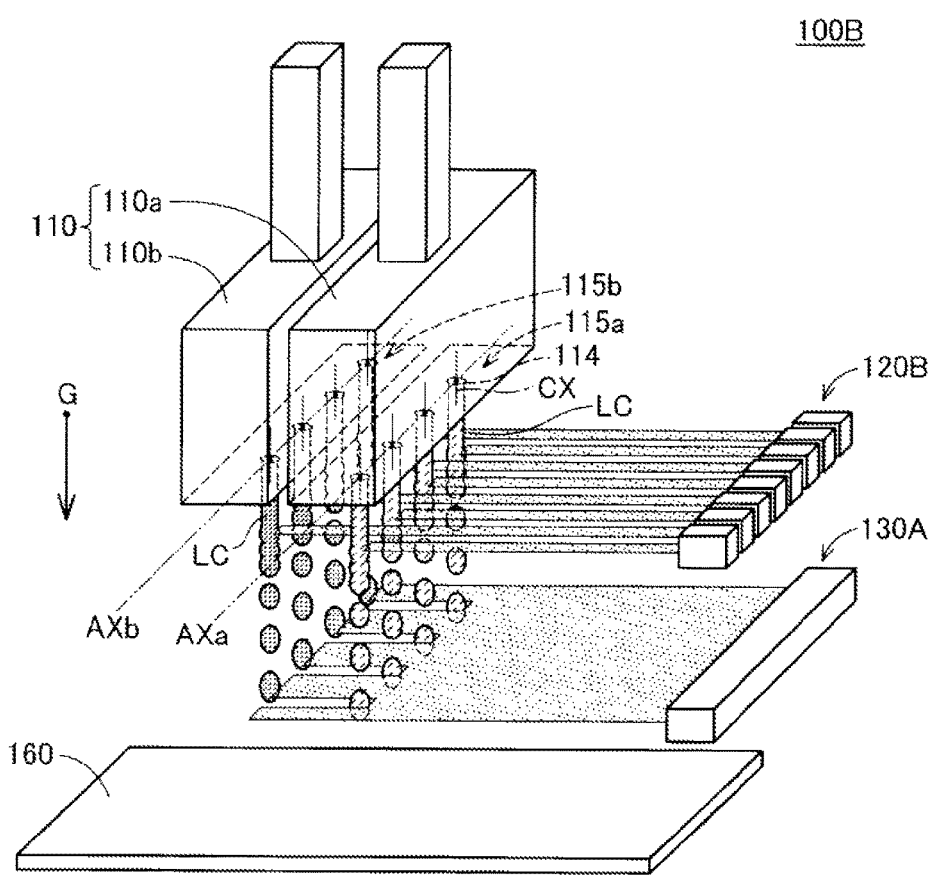
FIG. 9 is a diagram schematically depicting a configuration of a liquid discharge apparatus of a third embodiment.

FIG. 9 is a diagram schematically depicting a configuration of a liquid discharge apparatus 100B of the third embodiment of the invention. Similar to FIG. 8, FIG. 9 illustrates the head unit 110, a liquid droplet generating unit 120B, the direction changing unit 130A, and the forming stage 160 included in the liquid discharge apparatus 100B of the third embodiment. The liquid discharge apparatus 100B of the third embodiment is substantially the same as the liquid discharge apparatus 100A of the second embodiment, except for a different configuration of the liquid droplet generating unit 120B. In the liquid discharge apparatus 100B of the third embodiment, the liquid droplet generating unit 120B performs irradiation with the plurality of laser beams in parallel, similar to the direction changing unit 130 described in the first embodiment. The liquid droplet generating unit 120B is capable of performing irradiation with the number of laser beams that is equal to the number of nozzles 114 in the head unit 110, and irradiates one liquid column LC extending downwardly from each of the nozzles 114 with one laser beam. In the third embodiment, the control unit 101 adjusts an emitting interval, a wavelength, intensity, or the like, of each laser beam that is emitted from the liquid droplet generating unit 120B such that liquid droplets having a different size are generated from each nozzle 114. In the liquid discharge apparatus 100B of the third embodiment, it is possible to control the size of the liquid droplets that are generated from each of the nozzles 114. In addition, similar to the description in the second embodiment, the discharge apparatus of the third embodiment is efficiently used, because the irradiation with the laser beam that is emitted from the direction changing unit 130A enables the flying directions of the plurality of liquid droplets to be changed at a time. In addition, in the liquid discharge apparatus 100B of the third embodiment, it is possible to achieve the same types of various operational effects as described in the embodiments described above.

D. Fourth Embodiment

Figure 10:
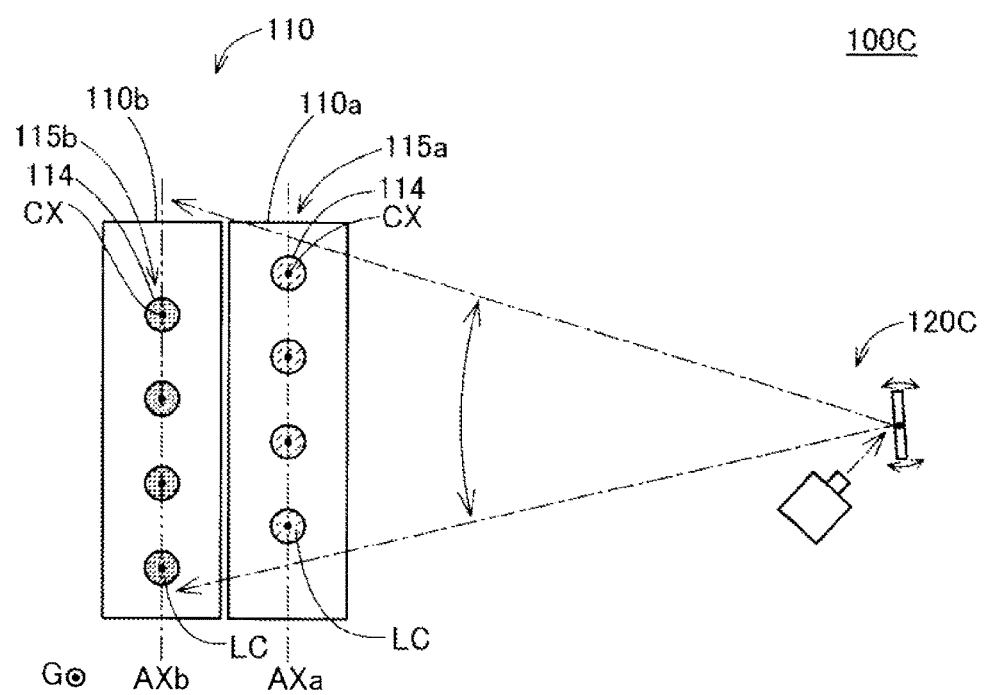
FIG. 10 is a diagram schematically depicting a configuration of a liquid discharge apparatus of a fourth embodiment.

FIG. 10 is a diagram schematically depicting a configuration of a liquid discharge apparatus 100C of the fourth embodiment of the invention. Similar to FIG. 5, FIG. 10 schematically illustrates the head unit 110 and a liquid droplet generating unit 120C, when the liquid discharge apparatus 100C is viewed from below in the vertical direction. The liquid discharge apparatus 100C of the fourth embodiment has substantially the same configuration as the liquid discharge apparatus 100 described in the first embodiment, except for a different configuration of the liquid droplet generating unit 120C. The liquid droplet generating unit 120C of the fourth embodiment performs irradiation with the laser beam from the same position as the liquid droplet generating unit 120 of the first embodiment. The liquid droplet generating unit 120C performs horizontal scanning with the laser beam emitted from one laser beam source, in the arrangement direction of the nozzles 114, by using a galvano mirror or a digital micromirror device. The liquid droplet generating unit 120C performs the scanning with the laser beam such that all of the nozzles 114 of the nozzle arrays 115a and 115b are arranged within an irradiation range when viewed in the vertical direction. Note that it is desirable that the arrangement positions of the nozzles 114 are determined in the head unit 110 such that the nozzles 114 of the nozzle arrays 115a and 115b do not overlap each other when viewed from the irradiation position of the laser beam emitted from the liquid droplet generating unit 120C. The liquid droplet generating unit 120C continuously irradiates, with one laser beam, the plurality of liquid columns LC extending downwardly from the plurality of nozzles 114, and applies light energy for generating the liquid droplets to the plurality of liquid columns LC. Note that a diameter of a spot of the laser beam that is emitted from the liquid droplet generating unit 120C may be larger than a diameter of the liquid column LC. However, in terms of irradiation efficiency of the laser beam, it is preferable that the diameter of the corresponding spot is smaller than or equal to the diameter of the liquid column LC. Also in the liquid discharge apparatus 100C of the fourth embodiment, it is possible to achieve the same types of various operational effects as described in the embodiments described above.

E. Modification Example

E1. Modification Example 1

The liquid discharge apparatuses 100 and 100A to 100C of the embodiments described above are configured as a 3D printer that discharges a liquid material and forms a three-dimensional object. By comparison, the liquid discharge apparatuses 100 and 100A to 100C of the embodiments described above may be configured, for example, as an ink jet printer that discharges ink and forms an image. In this case, ink droplets are discharged to a printing medium or a recording medium as a target object on which the liquid droplets land, instead of the forming stage 160. In addition, the energy applying unit 150 may be omitted. In the liquid discharge apparatuses 100, 100A, and 100B of the embodiments described above, the forming stage 160 is the target object on which the liquid material lands. In this respect, the target object, on which the liquid material lands, is not limited to the forming stage 160. The liquid discharge apparatuses 100, 100A, and 100B may discharge the liquid material to a metal plate that is detachably attached on the forming stage 160, to a three-dimensional object obtained by sintering the powder material, or to a three-dimensional object obtained by melting and then solidifying the powder material, as the target object, instead of the forming stage 160.

E2. Modification Example 2

The configuration of the arrangement of the nozzles 114 in the head unit 110 in the embodiments described above is not limited to the configurations in the embodiments described above. For example, the head unit 110 may have one or more nozzle arrays, in addition to the two nozzle arrays 115a and 115b. In addition, in the head unit 110, the plurality of nozzles 114 may not be arranged to form the zigzag shape. For example, when viewed from the irradiation position of the laser beam, two or more nozzles 114 which configure the second nozzle array 115b may be disposed between the two or more nozzles 114 which are adjacent in the first nozzle array 115a. In addition, when viewed from the irradiation position of the laser beam, the nozzles 114 of the first nozzle array 115a and the nozzles 114 of the second nozzle array 115b have portions which overlap to each other, and the positions of the nozzles 114 in the arrangement direction may be shifted. In the nozzle arrays 115a and 115b, the nozzles 114 may not be arranged at equal intervals, or, for example, the nozzles may be arranged at random intervals. In the nozzle arrays 115a and 115b, the nozzles 114 may not be arranged in a straight line, or, for example, the nozzles may be arranged in a curved line. In addition, the nozzles arrays 115a and 115b may not be disposed in parallel, or, for example, the directions in which the nozzles 114 are arranged may be disposed to intersect with each other.

E3. Modification Example 3

In the embodiments described above, the liquid droplet generating units 120, 120B, and 120C are configured to irradiate, with one laser beam, the liquid columns LC extending downwardly from all of the nozzles 114 of the head unit 110 at the same time. By comparison, the liquid droplet generating units 120, 120B, and 120C may be configured to irradiate, with one laser beam, only the liquid columns LC extending downwardly from some of the plurality of the nozzles 114 of the head unit 110. In this case, the liquid droplet generating units 120, 120B, and 120C may be configured to apply the light energy to all of the liquid columns LC extending downwardly from the head unit 110, with using the plurality of laser beams that are emitted from a plurality of light sources. In the embodiments described above, the liquid droplet generating units 120, 120B, and 120C performs irradiation with the laser beam in the direction orthogonal to the arrangement direction of the nozzles 114 in the first and second nozzle arrays 115a and 115b. By comparison, the irradiation with the laser beam is performed in a direction intersecting with the arrangement direction of the nozzles, other than the direction orthogonal to the arrangement direction of the nozzles 114 in the nozzle arrays 115a and 115b.

E4. Modification Example 4

In the embodiments described above, different types of liquid materials are discharged from each of the nozzle arrays 115a and 115b, and a liquid material that is discharged from the first nozzle array 115a and a liquid material that is discharged from the second nozzle array 115b play different roles from each other in the three-dimensional object that is formed and contain different components of the material components from each other. By comparison, the same type of liquid material may be discharged from the nozzle arrays 115a and 115b. In this case, for example, between the first and second nozzle arrays 115a and 115b, physical discharge conditions of the liquid materials such as discharge of the liquid material at different pressure or temperature may be changed. In addition, in the embodiments described above, the nozzles 114 of the first nozzle array 115a and the nozzles 114 of the second nozzle array 115b communicate with different liquid chambers 113 from each other, respectively. By comparison, the nozzles 114 of the first and second nozzle arrays 115a and 115b may communicate with a common liquid chamber 113.

E5. Modification Example 5

In the liquid discharge apparatuses 100 and 100A to 100C of the embodiments described above, a timing of the irradiation with the laser beam by the liquid droplet generating units 120, 120B, and 120C is adjusted and two types of liquid droplets L1 and L2 having different sizes are generated. By comparison, the liquid discharge apparatuses 100 and 100A to 100C of the embodiments described above may be configured to continuously generate the liquid droplets having one size. In this case, the control unit 101 may select a liquid droplet that has to land on the forming stage 160 from the liquid droplets having one size and may cause the direction changing unit 130 to execute the irradiation with the laser beam, according to the timing at which the liquid droplets are generated. The liquid discharge apparatuses 100 and 100A to 100C may be configured to generate three or more types of liquid droplets having different sizes. In addition, the control unit 101 may adjust, for example, the intensity or the wavelength of the laser beam instead of the irradiation intervals of the laser beams in order to generate liquid droplets having different sizes.

E6. Modification Example 6

In the liquid discharge apparatuses 100 and 100A to 100C of the embodiments described above, the direction changing units 130 and 130A apply light energy to the first liquid droplets L1 having the small size and change the flying direction of the first liquid droplets. By comparison, the direction changing units 130 and 130A may apply light energy to the second liquid droplets L2 having the large size and may change the flying direction of the second liquid droplets. In addition, regardless of the magnitude of the size, the direction changing units 130 and 130A may be configured to change the flying direction of the liquid droplets selected by the control unit 101.

E7. Modification Example 7

In the liquid discharge apparatuses 100 and 100A to 100C of the embodiments described above, the direction changing units 130 and 130A apply light energy to the liquid droplets through the irradiation with the laser beam and change the flying direction of the liquid droplets. By comparison, the direction changing units 130 and 130A may apply energy other than the light energy to the liquid droplets, thereby changing the flying direction of the liquid droplets. The direction changing units 130 and 130A may apply energy to the liquid droplets by using a maser, thereby changing the flying direction of the liquid droplets. In addition, the direction changing unit 130 may cause a current of air or the like to be produced and apply kinetic energy to the liquid droplets, thereby changing the flying direction of the liquid droplets. In addition, in the embodiments described above, similar to the liquid droplet generating unit 120C of the fourth embodiment, the direction changing unit may be configured to perform scanning with the laser beam and thereby to continuously change the flying directions of the plurality of liquid droplets. In the embodiments described above, the condensed positions of the laser beams with which the direction changing units 130 and 130A performs irradiation may not be adjusted with accuracy as long as the flying direction of the liquid droplets can be changed. For example, without focusing the laser beam as a spot on the liquid droplets, the irradiation may be performed with a plane-shaped laser beam along a plane perpendicular to the flying direction of the liquid droplets and the flying direction of the liquid droplets may be changed. The direction changing units 130 and 130A may emit a pulsed laser beam.

E8. Modification Example 8

In the liquid discharge apparatuses 100 and 100A to 100C of the embodiments described above, the liquid droplets of which the flying direction is changed by the direction changing units 130 and 130A land on the forming stage 160, and the liquid droplets of which the flying direction is not changed by the direction changing units 130 and 130A are collected in the collecting unit 140. By comparison, the liquid droplets of which the flying direction is not changed by the direction changing units 130 and 130A may land on the forming stage 160, and the liquid droplets of which the flying direction is changed by the direction changing units 130 and 130A may be collected in the collecting unit 140.

E9. Modification Example 9

In a configuration of the modification example 8 described above, the receptacle 141 of the collecting unit 140 may be configured to move in the horizontal direction by an actuator that includes a shaft or a motor, for example, under control of the control unit 101. In this case, the control unit 101 may cause the receptacle 141 of the collecting unit 140 to move vertically below the nozzles 114 until the direction changing unit 130 starts irradiation with the laser beam, and may cause the receptacle to move away from the region vertically below the nozzles 114 while the direction changing unit 130 performs the irradiation with the laser beam. As described above, when the receptacle 141 of the collecting unit 140 is configured to be movable, it is possible to reduce waste of the liquid droplets which uselessly land on the forming stage 160.

E10. Modification Example 10

In the liquid discharge apparatuses 100 and 100A to 100C of the embodiments described above, the collecting unit 140 collects at least some liquid droplets generated by the liquid droplet generating units 120, 120B, and 120C, and the collected liquid is resupplied to the head unit 110. By comparison, the liquid material collected in the collecting unit 140 may not be resupplied to the head unit 110 or, for example, may be discarded as it is. Otherwise, in the liquid discharge apparatuses 100 and 100A to 100C of the embodiments described above, the collecting unit 140 may be omitted.

E11. Modification Example 11

In the liquid discharge apparatuses 100 and 100A to 100C of the embodiments described above, the liquid supply unit 105 may be configured to supply a high-pressure liquid material to the head unit 110 and it is possible to arbitrarily change the configuration thereof.

E12. Modification Example 12

In the liquid discharge apparatuses 100 and 100A to 100C of the embodiments described above, the energy applying unit 150 sinters or solidifies the liquid droplets whenever the liquid droplets land. By comparison, the energy applying unit 150 may apply energy, sinter, or solidify the liquid droplets by overheating the liquid droplets in a heating furnace or the like after molding is completed with a liquid material having a high viscosity to the extent that a shape is maintained after landing. In addition, the source of the energy applied by the energy applying unit 150 is not limited to the laser beam, and, for example, a heater may apply thermal energy, or may apply light energy such as ultraviolet light, or electromagnetic energy such as a microwave, depending on the characteristics of the liquid.

E13. Modification Example 13

In the embodiments described above, some or all of functions and processes executed by software may be executed by hardware. In addition, some or all of functions and processes executed by hardware may be executed by software. It is possible to use, as hardware, various types of circuits such as an integrated circuit, a discrete circuit, or a circuit module in which the circuits are combined.

The invention is not limited to the embodiments, examples, or modification examples described above, and it is possible to implement the invention with various configurations within a range without departing from a gist thereof. For example, it is possible to appropriately replace or combine technical features described in the embodiments, examples, and modification examples, which correspond to technical features in the aspects described in Summary, in order to achieve some or all of the objects described above or in order to achieve some or all of the effects described above. In addition, if the technical features are not described as essential in the specification, it is possible to appropriately remove the technical features.

The entire disclosure of Japanese patent No. 2015-255791, filed Dec. 28, 2015 is expressly incorporated by reference herein.

What is claimed is:

1. A liquid discharge apparatus comprising:
   a head unit that discharges a liquid from each of a plurality of nozzles and causes a liquid column to extend downwardly;
   a liquid droplet generating unit that irradiates the liquid column with at least one laser beam from a position separated from the plurality of nozzles and separates liquid droplets from the liquid column; and
   a direction changing unit that applies energy to the liquid droplets and changes a flying direction of the liquid droplets,
   wherein the head unit includes first and second nozzle arrays in each of which the plurality of nozzles are arranged, and
   wherein, when the head unit is viewed in a direction toward the head unit from a position at which the liquid droplet generating unit emits the laser beam, the first nozzle array is positioned in front of the second nozzle array and each of the nozzles included in the second nozzle array is disposed at a position shifted in a horizontal direction from each of the nozzles included in the first nozzle array,
   wherein the liquid droplet generating unit irradiates, with the at least the one laser beam, the liquid columns extending downwardly from the first nozzle array and the liquid columns extending downwardly from the second nozzle array.

2. The liquid discharge apparatus according to claim 1, wherein the laser beam has a condensed shape of which a horizontal width in the horizontal direction is wider than a vertical width in a vertical direction and irradiation is performed over a plurality of the liquid columns extending downwardly from the first and second nozzle arrays, respectively.

3. The liquid discharge apparatus according to claim 1, wherein the liquid droplet generating unit performs scanning with the laser beam such that irradiation is performed on a plurality of the liquid columns extending downwardly from the first and second nozzle arrays, respectively.

4. The liquid discharge apparatus according to claim 1, wherein the direction changing unit performs irradiation with a laser beam and applies light energy as the energy to the liquid droplets generated from the first and second nozzle arrays, respectively.

5. The liquid discharge apparatus according to claim 4, wherein the direction changing unit irradiates, with at least the one laser beam, the liquid droplets generated from the first nozzle array and the liquid droplets generated from the second nozzle array.

6. The liquid discharge apparatus according to claim 1, wherein the head unit includes
   a first liquid chamber that communicates with each of the plurality of nozzles which configure the first nozzle array, and that stores a liquid, and
   a second liquid chamber that communicates with each of the plurality of nozzles which configure the second nozzle array, and that stores a liquid.

7. The liquid discharge apparatus according to claim 6, wherein the liquid stored in the first liquid chamber is a first liquid, and
   wherein the liquid stored in the second liquid chamber is a second liquid containing a component that is different from components of the first liquid.

8. The liquid discharge apparatus according to claim 1, wherein the liquid droplet generating unit generates liquid droplets having a first size and liquid droplets having a second size that is larger than the first size.

9. The liquid discharge apparatus according to claim 8, further comprising:
   a collecting unit that collects the liquid droplets having the first size or the liquid droplets having the second size and resupplies the collected liquid to the head unit.

10. The liquid discharge apparatus according to claim 9, wherein the direction changing unit changes a flying direction of the liquid droplets having the first size, but does not change a flying direction of the liquid droplets having the second size, and
    wherein the collecting unit does not collect the liquid droplets having the first size, of which the flying direction is changed, but collects the liquid droplets having the second size, of which the flying direction is not changed.

11. The liquid discharge apparatus according to claim 9, wherein the direction changing unit changes a flying direction of the liquid droplets having the first size, but does not change a flying direction of the liquid droplets having the second size, and
    wherein the collecting unit collects the liquid droplets having the first size, of which the flying direction is changed, but does not collect the liquid droplets having the second size, of which the flying direction is not changed.

12. The liquid discharge apparatus according to claim 1, further comprising:
    an energy applying unit that applies energy to the liquid droplets having landed on a predetermined target object.

13. The liquid discharge apparatus according to claim 12, wherein the liquid is a flowable composition that contains powder and a solvent, and
    wherein the energy applying unit applies energy to the liquid droplets having landed, thereby sintering the powder in the liquid droplets or melting the powder in the liquid droplets and then solidifying the powder.

14. A method for discharging a liquid comprising:
    discharging a liquid from each of a plurality of nozzles and causing a liquid column to extend downwardly;
    irradiating the liquid column with at least one laser beam from a position separated from the plurality of nozzles and separating liquid droplets from the liquid column; and applying energy to the liquid droplets and changing a flying direction of the liquid droplets, wherein the causing the liquid column to extend downwardly includes forming liquid columns extending downwardly from first and second nozzle arrays in each of which the plurality of nozzles are arranged, and wherein, when the first and second nozzle arrays are viewed from a position at which the laser beam is emitted in the irradiating with the laser beam, the first nozzle array is positioned in front of the second nozzle array and each of the nozzles included in the second nozzle array is disposed at a position shifted in a horizontal direction from each of the nozzles included in the first nozzle array, and wherein the liquid droplet generating unit irradiates, with the at least the one laser beam, the liquid columns extending downwardly from the first nozzle array and the liquid columns extending downwardly from the second nozzle array.

* * * * *